United States Patent [19]
Betts

[11] Patent Number: 4,769,871
[45] Date of Patent: Sep. 13, 1988

[54] SHRIMP PEELING MACHINE AND METHOD

[75] Inventor: Edmund D. Betts, Libertyville, Ill.

[73] Assignee: Gregor Jonsson Associates, Inc., Highland Park, Ill.

[21] Appl. No.: 897,078

[22] Filed: Aug. 18, 1986

[51] Int. Cl.⁴ .............................................. A22C 29/02
[52] U.S. Cl. ........................................... 17/48; 17/73
[58] Field of Search ................................ 17/71, 72, 73

[56] References Cited

U.S. PATENT DOCUMENTS

| | | | |
|---|---|---|---|
| 4,281,436 | 8/1981 | Hoffman et al. | 17/73 X |
| 4,439,893 | 4/1984 | Betts | 17/72 |
| 4,472,858 | 9/1984 | Keith | 17/72 |

FOREIGN PATENT DOCUMENTS 200443 12/1955 Australia ................................ 17/72

Primary Examiner—Willie G. Abercrombie
Attorney, Agent, or Firm—Marshall, O'Toole, Gerstein, Murray & Bicknell

[57] ABSTRACT

There is disclosed an improved shrimp processing machine which employs a constant speed conveyor feed means which permits the utilization of a reduced number of clamp assemblies for clamping and transporting shrimp to be processed to various processing stations. The machine further includes shrimp deflection means to prevent shrimps from falling into the machine and improved adjusting means for adjusting the means for removing shrimp meat from the shell following a cutting operation.

25 Claims, 6 Drawing Sheets

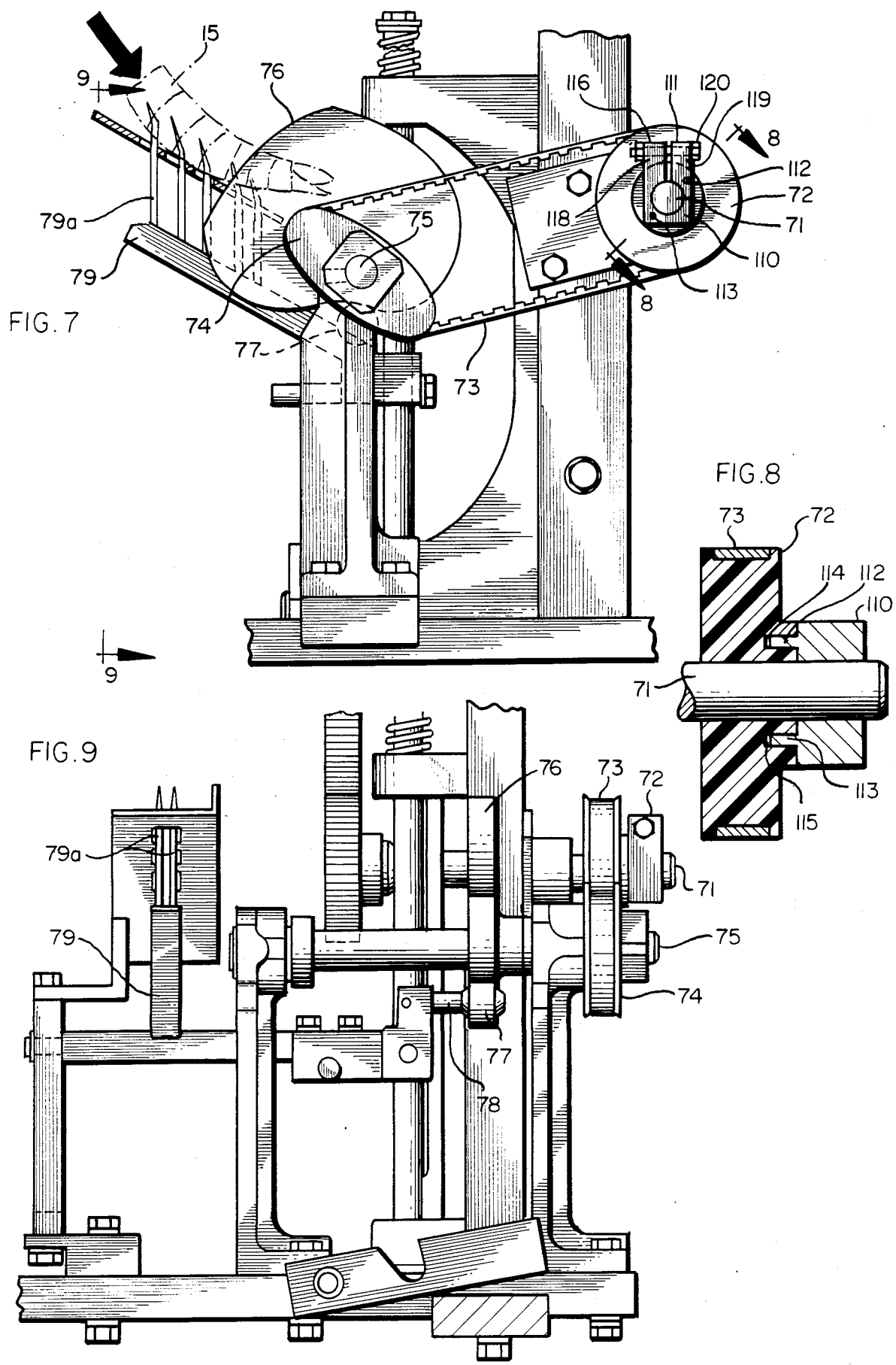

SHRIMP PEELING MACHINE AND METHOD

The invention disclosed and claimed herein relates to a new, improved and unobvious shrimp peeling machine and more particularly to a shrimp peeling machine which utilizes a constant speed shrimp feeding assembly whereby shrimp to be processed are fed at a uniform speed to improved shrimp processing apparatus.

BACKGROUND OF THE INVENTION

Various production machines presently are available in the shrimp processing industry for processing shrimp. In a conventional production operation, shrimp are transported to various work stations where the shrimp shell is first cut and then the cut shell and vein are removed. Shrimp often are transported to the work stations by depositing the shrimp on a plurality of trays located on a conveyor means which travels at intermittent speeds past the shrimp processing equipment. A shrimp to be processed is removed from a tray and retained in a clamp assembly which delivers the shrimp to a plurality of work stations which remove the shell and devein the shrimp.

An example of a conventional production machine employing intermittent shrimp delivery operation is disclosed in U.S. Pat. No. 3,751,766. Six clamping stations located on a rotary drive wheel are operated in timed relation to the intermittent conveyor system whereby shrimp are removed automatically from the conveyor trays and deposited and maintained in a clamping assembly for delivery to the shrimp processing stations. Following deveining of the shrimp and removal of the shell, the processed shrimp are released from the clamping assemblies.

While shrimp processing equipment presently used is satisfactory, it has been found that, in some instances, the use of a shrimp conveyor system traveling at an intermittent speed in association with the six clamping stations creates a number of undesirable problems. For example, it has been found that the intermittent conveyor movement presents difficulties to an operator who manually loads shrimp on to the conveyor trays. Specifically, an operator generally must hand load and orient the shrimp on a conveyor tray during the dwell or stop portion of the intermittently moving conveyor. The dwell time has been estimated to be approximately seventy five percent of a total cycle. Unfortunately, if an operator attempts to load shrimp while the conveyor is accelerating in the course of being indexed, the conveyor speed is too great such that it is extremely difficult to hand load shrimp on the conveyor trays. Thus, if an operator falls out of synchronization with the dwell period on the intermittently moving conveyor, it is difficult to recover such that shrimp are not deposited in a number of trays before the operator is again able to be in synchronization with the conveyor movement.

Further, when utilizing shrimp processing equipment employing a conveyor operating at intermittent speeds, six shrimp clamping assemblies are utilized to transport shrimp to the various shrimp processing stations. The clamping assemblies are located on a rotary drive unit, being located at approximately 60° intervals from one another. In some instances, a shrimp is not properly lodged in a clamping assembly and the shrimp inadvertently falls out of the clamping assembly. Often, shrimp which fall out of the clamping stations do not fall clear of the machines but instead becomes lodged in the machine hardware.

It is desired to have a shrimp processing machine which obviates the problems presently found with shrimp loading and processing equipment presently available.

SUMMARY OF THE INVENTION

The invention disclosed and claimed herein serves to minimize the problems found with conventional shrimp peeling machines. Briefly, the shrimp peeling machine of the present invention utilizes a conveyor system which delivers shrimp to the shrimp processing stations at a constant rate of speed whereby an operator can constantly load shrimp onto a conveyor tray whereas previously, because of the high acceleration rate of the conveyor between indexing, an operator had difficulty loading shrimp during this acceleration period. Thus, for a certain period of the total cycle time, estimated to be twenty five percent, the conveyor system generally was unavailable for shrimp loading.

While the productivity of the improved shrimp processing machine is limited by the efficiency of the human loader or operator, the uniform speed conveyor results in greater shrimp through put capacity due to the increased percentage of cycle time that is available for loading shrimp on to the conveyor; i.e., one hundred percent. The shrimp peeling machine of the present invention allows increased and more efficient shrimp loading by an operator without a reduction in production rate as compared to production rates with shrimp processing machines presently available.

Additionally, utilization of a constant speed conveyor system requires the space between the clamping assemblies to be increased from 60° to 90°. The effect is that only four shrimp clamping stations are used instead of the six stations previously employed. As a result, shrimp deflection means is incorporated into the machine to prevent loose shrimp from falling into the hardware.

In the course of a shrimp processing operation, the shrimp or meat is stripped from the shell. The shell remains in the clamping assembly until it is subsequently released. The operation of the shrimp meat removal system by means of a plurality of meat picking tines is disclosed in U.S. Pat. No. 4,413,377. As disclosed in that patent, the location of the meat picking tines is important for proper penetration of the shrimp meat during the shell removal process. The location of the tines along a descending path of transfer of the shrimp assures penetration of the shrimp in a manner that prevents the tines from raking or tearing the shrimp meat. An improved meat picker drive system has been provided with the present invention that utilizes an elliptical pulley. By utilizing an elliptical pulley in the meat picker drive system, the location of the meat picking tines can be arranged to provide additional space for an additional water spray in the deveining operation. It is often necessary however, to adjust the tines in order so that they engage the shrimp at the desired time in the processing operation, it being particularly important that the tines not unduly tear or rip the shrimp in the course of removing the shrimp meat from the shell. An improved meat picker adjusting system has been provided with the present invention in place of the adjusting system previously utilized which required a relatively laborious and sensitive adjusting operation involving the removal of fastening members and a trial and error method in changing the gear mesh.

These and other advantages associated with the present invention will become more apparent from a further understanding of the drawings and detailed description.

DESCRIPTION OF THE DRAWINGS

FIG. 7 is an enlarged, section view of the elliptical cam adjusting means shown in FIG. 3 for adjusting the position of the stripping tines or the meat removal means to permit proper entry of the tines into the shrimp;

FIG. 8 is a section view along lines 8—8 in FIG. 7 showing the drive adjustment block and pulley means which are associated with the adjustment means shown in FIG. 7;

FIG. 9 is an end view taken along lines 9—9 of the adjusting means shown in FIG. 7;

DETAILED DESCRIPTION

Figure 1:
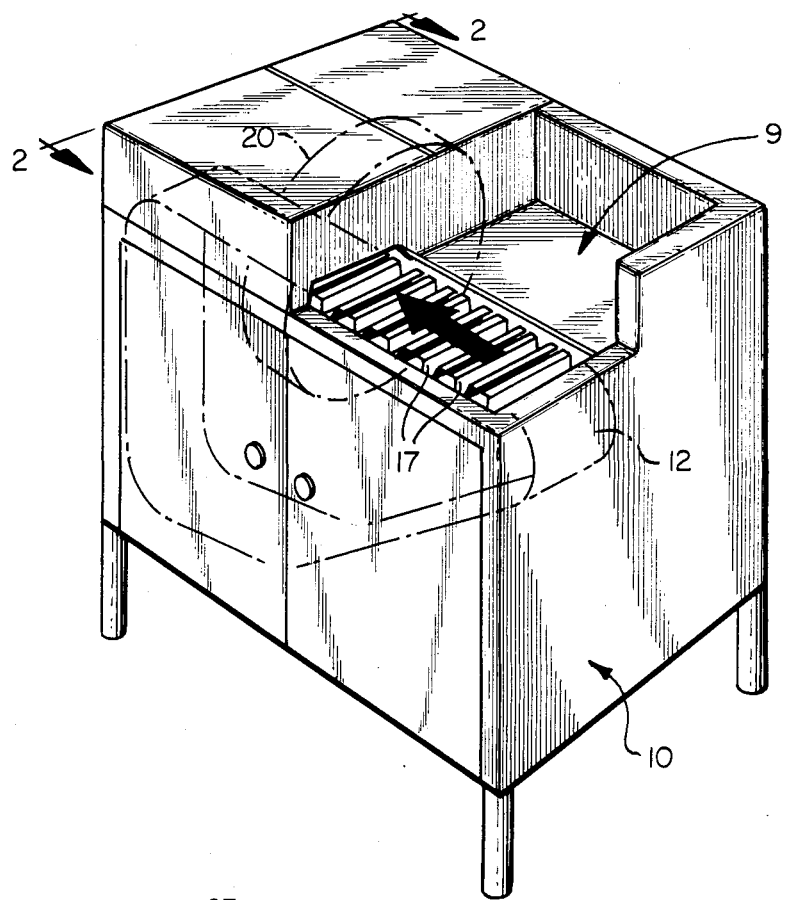
FIG. 1 shows a perspective view of the improved shrimp peeling machine of the present invention illustrating, by arrows, the path of conveyor movement relative to the path of movement of the shrimp transport system.

Referring to the drawings, there is shown a shrimp processing machine 10 comprising a conveyor assembly 12 having a plurality of trays 17 disposed on the conveyor. Shrimp 15, normally located in pan 9 prior to loading, are manually deposited by an operator in conveyor trays 17. The shrimp are transported to four shrimp clamping stations 20 connected to a rotary drive wheel 21 which is located 90° to shrimp conveyor assembly 12.

The conveyor system travels at uniform speed whereby trays 17 move at a constant rate of speed past the location of shrimp claimping stations 20.

Figure 2:
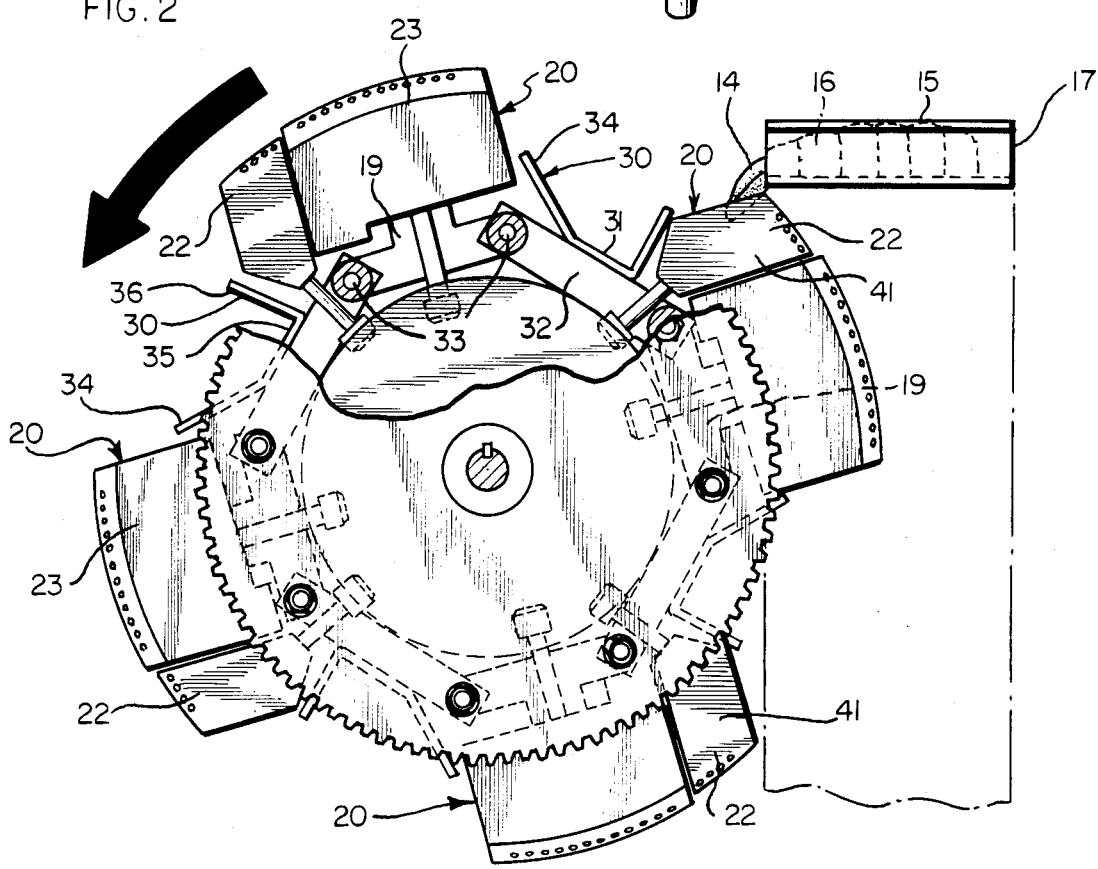
FIG. 2 shows a partial section view taken along lines 2—2 in FIG. 1 showing the shrimp conveyor system and the shrimp transport system including four clamping assemblies for transporting shrimp to various processing stations.

A shrimp 15 is deposited on a conveyor tray 17 and oriented on the tray so that shrimp tail 14 extends beyond the conveyor tray as seen in FIG. 2 where it is contacted and maintained by the small clamp assembly 22. The shrimp body 16 is deposited and maintained in the larger clamp assembly 23, FIGS. 3, 5. The clamped shrimp is rotated in the direction indicated by the arrows, FIGS. 1, 2, to various shrimp processing stations. The details of the clamping assembly are disclosed, for example, in U.S. Pat. Nos. 3,751,766 and 4,507,825.

A shrimp deflection assembly 30 is disposed between adjacent clamping assemblies 20. Each deflection assembly includes a deflection member 31 fixed or otherwise fastened to a deflection member support bar 32 having a hole 33 located at each end of the support bar. Deflection support bars 32 are removably fastened to clamp member 19 of clamp assembly 20. Shrimp deflection member 31 includes a base 35, a second, substantially vertical member 36 disposed adjacent to a small clamp assembly 22, and a third member 34 offset approximately 40° from the base 35. The deflection member is approximately the same width as the clamping assembly, the deflection member serving to deflect a shrimp which inadvertently falls from a clamping station 20.

The basic components of the shrimp peeling machine such as the clamping assemblies and the cutting, deveining and shell removal stations are disclosed in U.S. Pat. No. 3,751,766.

Figure 3:
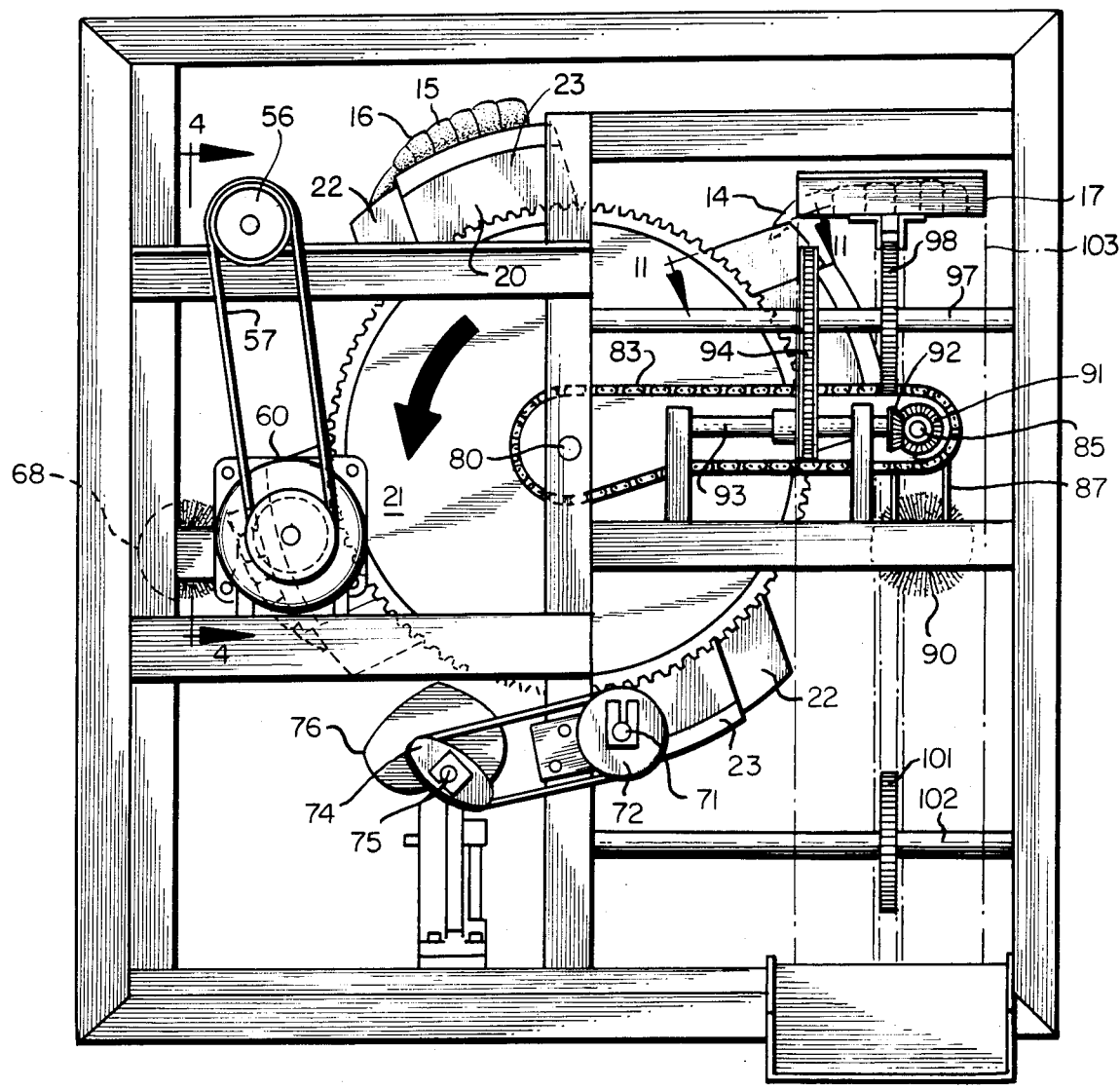
FIG. 3 is an elevation view showing a portion of the drive system, shrimp transport system and shrimp processing stations.
Figure 4:
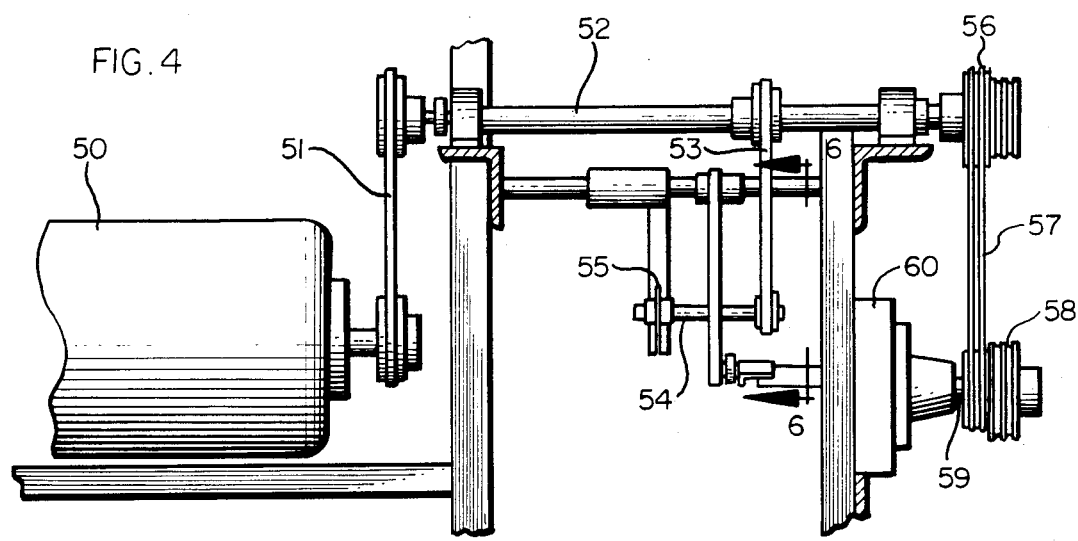
FIG. 4 is a partial section view taken along lines 4—4 in FIG. 3 showing the adjustable drive means for the shrimp peeling machine.
Figure 10:
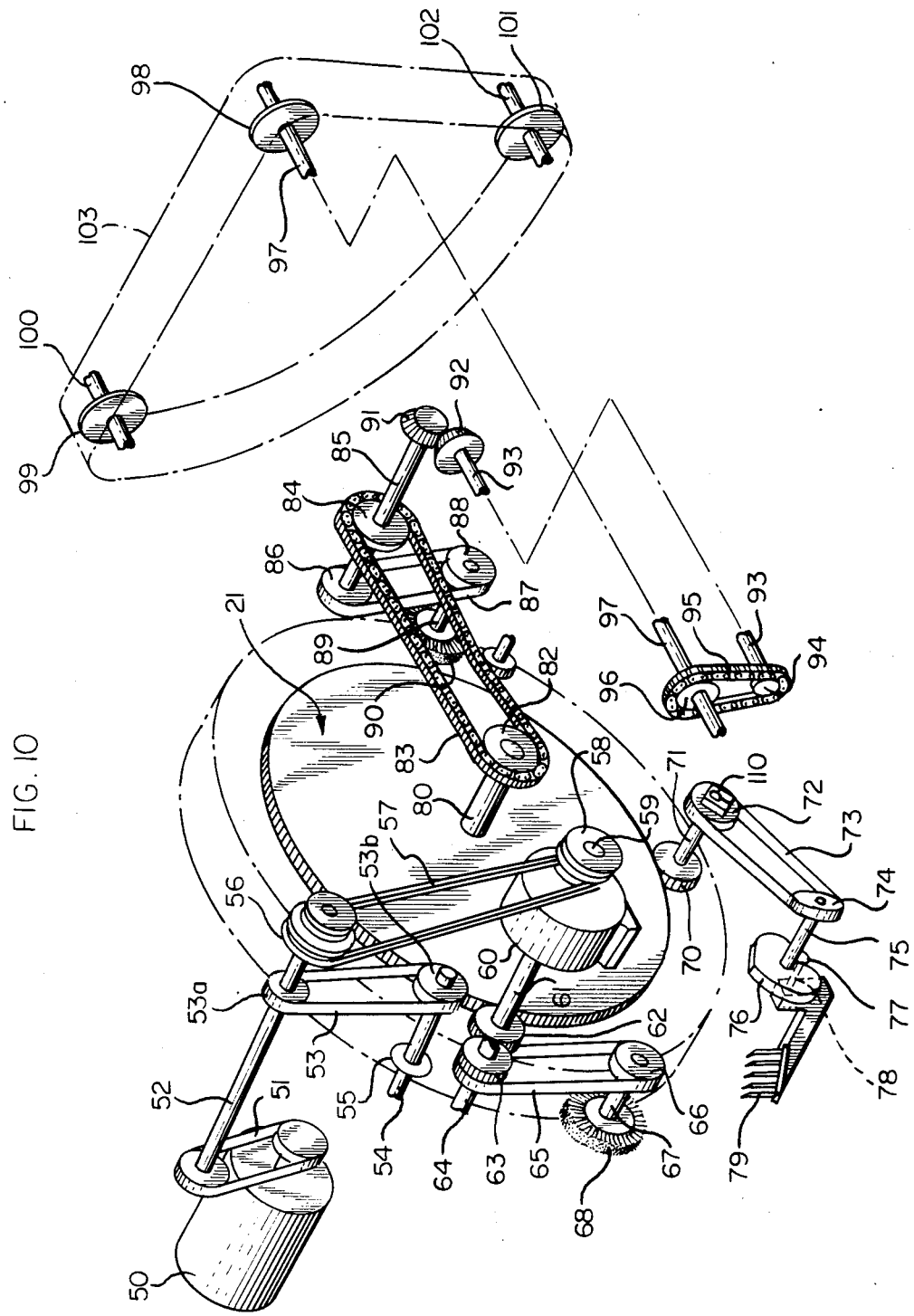
FIG. 10 is a schematic view of the drive system of the shrimp peeling machine of the present invention.

The drive system of the shrimp processing apparatus of the present invention is shown in FIGS. 10, 3 and 4 and includes motor 50 which is connected by V-belt 51 to power shaft 52. Positive drive belt 53 and pulleys 53a and 53b connect shaft 52 to cutter drive shaft 54 having cutter blade 55 disposed thereon for cutting shrimp as it is transported on clamp assemblies 20 past the cutting station and cutter blade 55.

A dual speed step pulley 56 is located at the end of shaft 52 and is connected by dual belts 57 to a dual speed step pulley 58 located at the end of gear box shaft 59. The two gear box drive belts 57 are shown in the high speed position. To change to a low speed, belts 57 are moved to the outside pairs of grooves on pulleys 56 and 58.

The dual pulley arrangement permits the machine to have two running speeds with the change from one speed to another being affected without tools. The change can be accomplished merely by moving the elastic pulley belts 57 from a first location available on pulleys 56, 58, as shown in FIG. 4, to a second available pulley location. Low conveyor speed, which is approximately 168 inches/minute, is about sixteen percent faster than the average speed achieved with the intermittently operated conveyor system utilized with conventional shrimp peeling machines. This increased speed achieved with the shrimp processing system of the present invention is somewhat slow for experienced shrimp loader operators but is viewed by some as a preferred speed for training new operators or when processing a shrimp which is difficult to peel. High speed which is about 200 inches/minute, is approximately 30% in excess of the speed achieved with conventional, intermittently operated machines and takes full advantage of the increased loading time available.

Gear box 60, which is connected to shaft 59, is also connected to one end of drive shaft 61. Drive gear 62 is fastened to the opposite end of shaft 61, and meshes with drive gear 21 and gear 63. Gear 63 rotates on fixed shaft 64.

A pulley, not shown, is located on shaft 64 and positive belt 65 disposed in said pulley is connected to pulley 66 fastened to deveiner drive shaft 67. Shrimp deveiner brush 68 rotates on shaft 67 and serves to devein shrimp as shrimp located in clamping assemblies 20 pass by brush 68.

Gear 70, driven by drive gear 21, is fixed to one end of shaft 71 and pulley 72 is located at the opposite end of shaft 71. Positive belt 73 connects pulley 72 to elliptical pulley 74 fixed to one end of shaft 75. Cam 76 which is located at the opposite end of shaft 75, contacts cam follower 77. Follower 77 is connected to one end of shaft 78, shown in dotted lines in FIG. 10, while the opposite end of shaft 78 is fastened to shrimp or meat picker means 79. Shrimp picker 79 is timed to enter the shrimp and remove the shrimp from shrimp shell as described, for example, in U.S. Pat. No. 3,751,766.

Drive shaft 80 is fixed to drive gear 21. Sprocket 82 is also fixed to shaft 80. Chain 83 is connected to sprocket 82 and sprocket 84 connected to drive shaft 85.

Pulley 86 is located at one end of shaft 85 and connects by positive belt 87 to pulley 88 which is located on one end of shell removal brush shaft 89. Brush 90 which removes shell from and cleans clamping assemblies 20 following a shrimp processing operation is disposed on the opposite end of shaft 89.

Referring again to shaft 85, bevel gear 91 is fastened to the remaining shaft end and meshes with bevel gear 92 fixed to drive shaft 93. Sprocket 94 is located at the opposite end of shaft 93. Endless chain 95 connects to sprocket 94 and sprocket 96 which rotates on fixed shrimp conveyor drive shaft 97. Sprocket 98 is joined to sprocket 96 while conveyor sprocket 99 is fixed to rotate on shaft 100 and sprocket 101 is fixed to rotate on shaft 102. Conveyor chain 103 having shrimp carrying trays 17 fastened thereto connect sprockets 98, 99 and 101.

Referring to FIGS. 3 and 7, elliptical pulley 74 and cam 76 are fixed to shaft 75. Drive belt 73 connects elliptical pulley 74 to drive belt 72. Upon rotation of cam 76, cam follower 77 and shaft 78 cause meat picker 79 to reciprocate up and down. During operation, pulleys 72 and 74, shaft 75 and cam 76 make one complete revolution and meat picker 79 makes one reciprocation as each clamping assembly 20 rotates past the meat picking station. The timing of the meat picker 79 in relation to the clamping assembly 20 and shrimp 15 contained therein is important in that the meat picker must penetrate the shrimp at a specified location. The method of timing will be described later.

Also important is the speed at which the meat picker reciprocates and specifically the speed of the upward portion of the reciprocation just prior to and during the penetration of the shrimp. As disclosed in U.S. Pat. No. 4,413,377, the location and the shape of the tine members in the meat picker are arranged such that the shrimp will be penetrated in a manner which prevents tearing of the shrimp meat. In the present invention, the use of elliptical pulley 74 provides for an increase in the velocity of the upward portion of the meat picker reciprocation during penetration of the shrimp. That is, while drive pulley 72 and belt 73 rotate at a constant speed, the speed of shaft 75 and cam 76 increases and decreases due to the change in pitch diameter of elliptical pulley 74. The orientation of the major axis of the elliptical pulley 74 with respect to the profile of cam 76 results in the increased speed occurring just as the meat picker penetrates the shrimp thereby preventing any substantial tearing or damage to the meat.

Referring to FIGS. 7-9, pulley 72 is fixed to shaft 71 by means of an adjustment block 110. Block 110 includes a U-shaped member 111 having projections or lugs 112, 113 adapted for insertion into projection receiving bores 114, 115 in pulley 72. Bore 116 extends through the legs 118, 119 of the U-shaped member and a fastener 120 is drawn to lock block 110 and pulley 72 onto shaft 71.

When it is necessary to adjust the timing of meat picker 79 relative to its entry into a shrimp 15, the adjustment can readily be made by loosening fastener 120 which in turn releases legs 116, 118 and loosens member 110 thereby permitting pulley 72 to rotate relative to shaft 71. Rotation of pulley 72 will cause movement of belt 73, elliptical pulley 74, shaft 75 and cam 76. Movement of cam 76 will actuate cam follower 77 and shaft 78 and thereby cause meat picker 79 and tines 79a to reciprocate up or down as required to the desired adjusted position. Once the proper adjustment has been made, fastener 120 is tightened and pulley 72 is again fixed on shaft 71.

Figure 11:
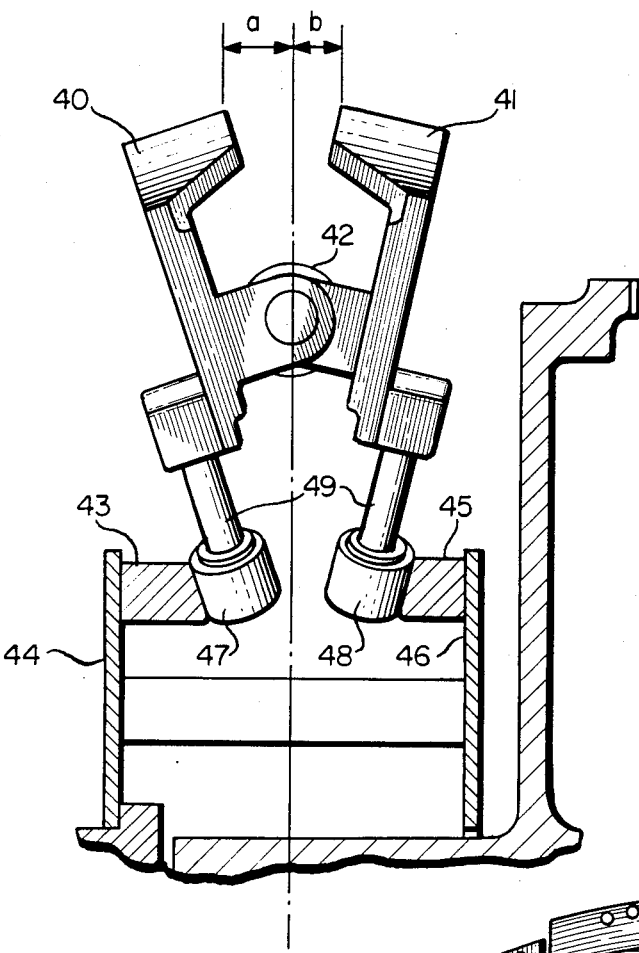
FIG. 11 is a section view taken along lines 11—11 in FIG. 3 showing offset, angled tail clamping members of a shrimp clamping assembly.
Figure 12:
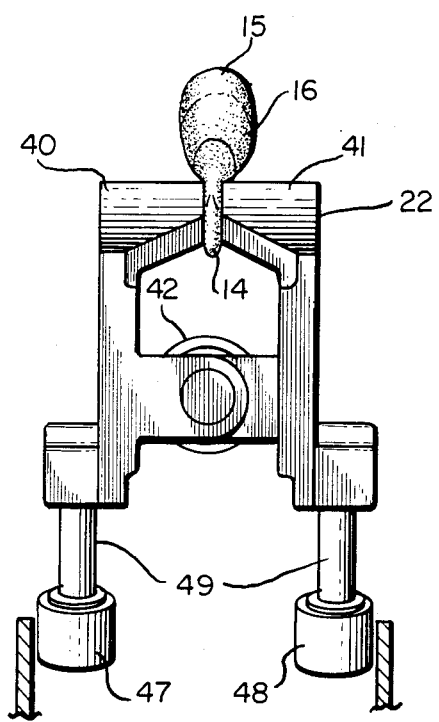
FIG. 12 shows a fragmentary end view of the shrimp tail clamping members in a closed position; and, FIG. 13 shows a fragmentary elevation view of the clamping assembly of FIG. 12.
Figure 13:
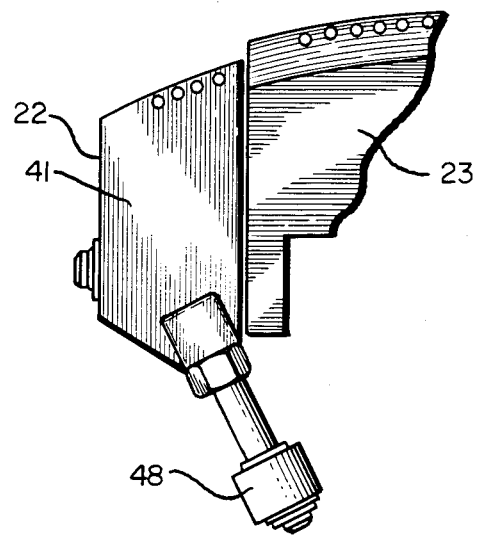

Referring to the clamping assemblies 20 used to clamp and maintain a shrimp while being processed, it is important that small clamp 22 of clamping assembly 20 properly contact a shrimp 15 located in conveyor tray 17. Small clamp assembly members 40, 41 shown in FIGS. 11-13, are normally biased toward one another by spring 42. Members 40, 41 are forced outwardly by a cam means so that a shrimp tail 14 can properly enter between clamp members 40, 41 which then close on shrimp tail 14 and assist in withdrawing shrimp 15 from conveyor tray 17 onto clamp assembly 20. Clamp member 40, as shown in FIG. 11, is opened to provide a distance "a" between the clamp member edge and the vertical axis while clamp member 41 is opened a less amount equal to the distance "b", the effect being that the opening "a" and "b" is offset from the vertical axis. Cams 43 and 45 are located on fixed cam plates 44, 46. The cams contact roller members 47, 48 which are connected to studs 49 fixed to clamp members 40, 41. Cam 43 extends outward from plate 44 further than cam 45 extends outward from fixed cam plate 46. When rollers 47, 48 contact the cams, clamp members 40, 41 are forced outwardly the distances "a" and "b" to form an offset opening as seen in FIG. 11 to receive a shrimp tail 14. The clamp members 40, 41 then close inwardly and retain the shrimp between the clamp members as seen in FIG. 12.

As discussed previously, the use of a constant speed conveyor drive requires the use of fewer clamping assemblies 20 which not only permits the utilization of shrimp deflector means 30 between clamping assemblies but also permits space to incorporate additional features into the machine.

Figure 5:
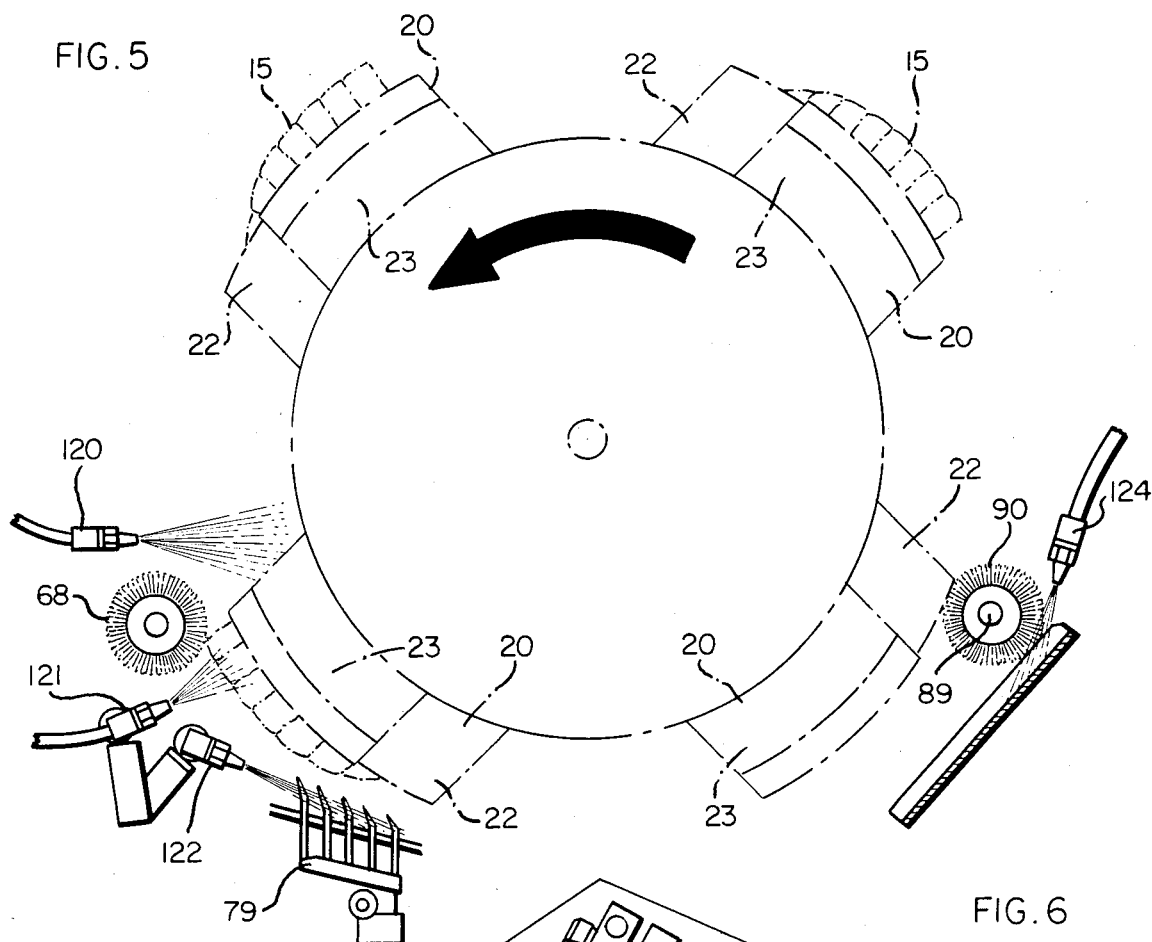
FIG. 5 is a schematic, elevation view of the shrimp transport system of the present invention showing spray and brush assemblies located at the shrimp deveining and shell removal stations.

FIG. 5 shows a schematic view of clamping assemblies 20 which are rotated relative to shrimp processing stations. At the shrimp deveining and shrimp removing stations, brush 68 serves to remove the vein from shrimp 15 after which the meat picker 79 enters the shrimp to assist in removing the meat from the shrimp shell. Previously, it was a problem, in some instances, to properly remove loose bits of vein from the shrimp after the deveining station; however, because of the additional space afforded by the utilization of an elliptical meat picker drive pulley, an additional spray system can be utilized. Specifically, in addition to upper deveiner spray nozzle 120, the shrimp processing apparatus of the present invention permits spray nozzle 121 to be incorporated. Spray nozzle 121 permits the shrimp to be washed following the deveining operation to insure that any loose vein is removed.

Similarly, spray nozzle 124 is disposed above shell removal brush 90 and assists in removing a shrimp shell from a clamping assembly 20 at the termination of a shrimp processing operation.

Figure 6:
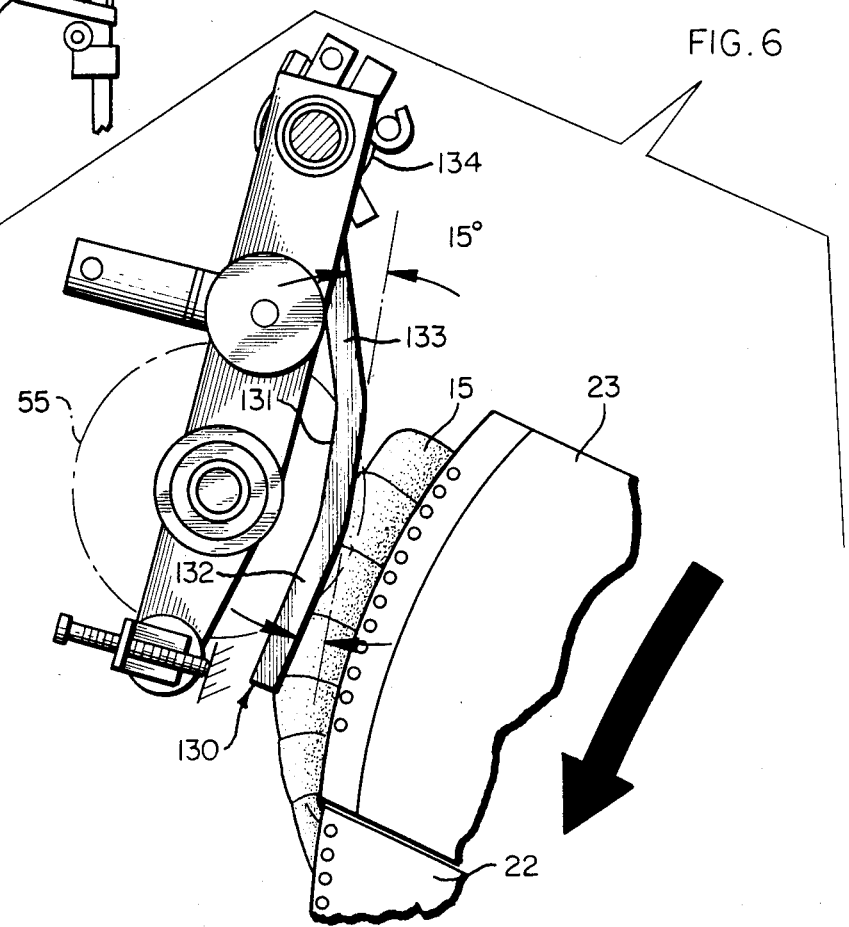
FIG. 6 is an enlarged, schematic sectional view along lines 6—6 in FIG. 4 showing the cutting blade and improved cutter guide bar for guiding and cutting a shrimp disposed in a clamping station.

Another improvement associated with the utilization of a constant speed shrimp delivery system relates to the shrimp cutter guide bar used to maintain the shrimp in position at the cutting station where the shrimp is slit along its longitudinal axis. The use of a cutter guide bar is disclosed in U.S. Pat. No. 4,472,858 which is incorporated herein by reference. Because of the increased constant speed of the machine of the present invention, it has been found that in some instances, the cutter guide bar heretofore used has a tendency to permit the shrimp to be pulled out of the clamp members at the higher velocity. An improved cutter bar serves to minimze this pull out tendency. Referring to FIG. 6, there is shown cutter 55 which passes through guide bar 130. Bar 130 includes a first portion 131 and second and third portions 132, 133 each offset at about 15° to portion 131. Bar 130 preferably comprises a one piece member and is made of stainless steel or other suitable substantially rigid material. Bar 130 is fixed to spring biased bushing 134.

While a particular embodiment of the present invention has been shown and described, modifications may be made, and it is therefore intended to cover all such changes and modifications as fall within the true spirit and scope of the invention.

The invention is claimed as follows:

1. A shrimp processing machine comprising:
   a conveyor means for transporting shrimp at constant speed to a location where shrimp is to be removed from said conveyor means;
   a plurality of processing stations including a shrimp cutting station and shrimp meat removal station;
   a plurality of clamping means each having a small and large clamp assembly for clamping and maintaining said shrimp in said clamp means; and,
   deflector means disposed between adjacent clamping means for deflecting shrimp from falling into said machine.

2. A shrimp processing machine in accordance with claim 1 wherein said deflector means includes a base and first and second deflector members extending outward and offset from said base.

3. A shrimp processing machine in accordance with claim 2 and further including a deflector base support bar removably fastened to said clamping means.

4. A shrimp processing machine in accordance with claim 3 wherein there are a maximum of four clamping means.

5. A shrimp processing machine in accordance with claim 1 wherein said small clamp assembly includes biased clamping members adapted to close upon the tail of a shrimp being processed; means for forcing said members to an open position relative to one another, one of said members being open a further distance than said remaining member whereby said open clamp members are offset from the vertical axis of said machine and a shrimp tail can freely enter between said tail clamping members.

6. A shrimp processing machine in accordance with claim 1 wherein said shrimp meat removal station includes a shrimp removal picker comprising a reciprocating shrimp picker having a plurality of tines adapted to enter said shrimp;
   an adjustable cam and a cam follower for adjusting the movement of said shrimp picker relative to a clamping means;
   a cam shaft upon which said cam is fixed;
   an elliptical pulley disposed upon said cam shaft;
   a second drive shaft having a second pulley releasably secured therein;
   a belt means connecting said elliptical and second pulley means; and,
   means for adjustably moving said second pulley means whereby said cam is adjusted to a desired position.

7. A shrimp processing machine in accordance with claim 6 wherein said adjusting means includes a U-shaped member adapted to be releasably secured on said second shaft;
   said U-shaped member having a pair of spaced legs and projections disposed thereon;
   said second pulley having bores adapted to receive said projections;
   a fastening means for releasably locking said U-shaped member on said second shaft;
   whereby upon releasing said fastening member, said second pulley can be rotated on said second shaft causing said elliptical pulley and cam member to be rotated so as to raise or lower said shrimp removal picker relative to said clamping means.

8. A shrimp processing machine in accordance with claim 1 and further including a cutter means for cutting said shrimp and shell along its length, said cutter means including a cutter guide bar having a first portion and a second and third portion extending outwardly and offset from said first portion.

9. A shrimp processing machine in accordance with claim 7 and further including a shrimp deveining station disposed contiguous to a shrimp shell removal station and including at least three spray nozzles for spraying fluid on said shrimp and said shrimp removal picker.

10. A shrimp procssing station in accordance with claim 9 and further including a shrimp shell removal station for removing the shell from said machine, said shell removal station including a spray nozzle means for spraying said shell removal station to remove shrimp shell from said machine.

11. A shrimp processing station in accordance with claim 1 including a dual pulley means for adjusting the uniform speed of said conveyor and shrimp clamping assemblies.

12. A shrimp processing machine comprising:
   a conveyor means for transporting shrimp at a constant speed to a location where shrimp is to be removed from said conveyor means;
   a plurality of processing stations for processing shrimp removed from said conveyor means including shrimp cutting and shrimp meat removal stations;
   four shrimp clamp means for receiving and moving shrimp to be processed to and through said processing stations;
   deflector means disposed between adjacent clamping means for deflecting shrimp being processed from falling into said machine;
   said shrimp meat removal means including a shrimp removal picker;
   means for adjusting said shrimp removal picker including an elliptical shaped pulley fastened to one of two ends of a cam shaft;
   a cam fixed to the remaining cam shaft end;

a second drive shaft having a second pulley thereon;

belt means connecting said elliptical pulley and second pulley; and, adjustment means for adjusting said second pulley relative to said second drive shaft whereby said elliptical pulley, cam and shrimp meat removal means are adjusted to a desired position.

13. A shrimp processing machine in accordance with claim 12 and further including a U-shaped member disposed on said second shaft; said U-shaped member having a pair of spaced legs and a plurality of projections;

said second pulley having a plurality of bores to receive said projections; and, a fastener means for releasably securing said legs in a locked position for fixing said second pulley on said second shaft.

14. A shrimp processing machine in accordance with claim 13, said clamping means each including small and large clamping assemblies;

said small clamp assembly each including a pair of clamping members;

a cam follower connected to each of said clamp members;

a cam member adapted to coact with said cam followers to open and close said clamp members; and, one of said cam members being formed to cause one of said clamp members to open further than said remaining clamp member to provide an offset opening in said small clamping assembly to receive a shrimp tail.

15. A shrimp processing machine in accordance with claim 12 wherein said deflector means each include a base and second and third members extending outward and offset from said base.

16. A shrimp processing machine in accordance with claim 14 wherein said second deflector member is disposed at an angle of about 90° to said base and said third deflector member is disposed at an angle of about 40° to said base.

17. A shrimp processing machine in accordance with claim 13 wherein said cutter station includes a cutter means and a shrimp cutter guide bar; said bar being substantially rigid and including a first, second and third portions, said second and third guide bar portions extending outwardly and offset from said first portion at an angle of approximately 15°.

18. A shrimp processing station in accordance with claim 16 and further including shrimp deveining and shell removal stations;

spray nozzle means for spraying said shrimp following a deveining operation and shrimp meat removal picker; and, a spray nozzle means for spraying fluid onto said shell removal means for removing shell from said machine.

19. Apparatus for adjusting shrimp meat removal means in a shrimp processing machine which includes a shrimp processing station for cutting said shrimp and shell and a shrimp meat removal station for removing shrimp meat from the shell, said shrimp meat removal station including;

a shrimp meat removal means;

means for adjusting said shrimp removal means, including an elliptical shaped pulley fastened to a rotatable cam shaft;

a cam fixed to said shaft;

a second drive shaft having a second pulley thereon;

belt means connecting said elliptical shaped pulley and said second pulley; and, adjustment means for adjusting said second pulley relative to said second shaft whereby said elliptical shaped pulley, cam and shrimp meat removal means are adjusted to a desired position.

20. Apparatus in accordance with claim 21 and further including a U-shaped member disposed on said second shaft; said U-shaped member having a pair of spaced legs and a plurality of projections;

said second pulley having a plurality of bores to receive said projections; and, a fastener means for releasably securing said legs in a locked position for fixing said pulley on said second shaft.

21. The method of processing a plurality of shrimp to be peeled according to the steps of:

depositing a plurality of shrimp onto a conveyor means traveling at a constant speed and in a substantially linear path;

transporting said shrimp on said conveyor means to a shrimp transport assembly comprising a plurality of shrimp clamping means assemblies, each assembly being spaced at least 90° to another assembly, said shrimp clamping means assemblies being rotatable in a circular path where the plane of said circular path is at substantially 90° to said linear path of said shrimp on said conveyor means;

activating said clamping means whereby said clamping means clamps the tail of a shrimp on said conveyor means; and removing said shrimp from said conveyor means;

clamping the tail and the sides of a shrimp in one of said clamping means assemblies prior to cutting the shell of said shrimp; and transporting said shrimp in said clamping means assemblies past a plurality of stations whereby the shrimp shell is cut and shrimp meat is removed from the shrimp shell.

22. The method of processing shrimp in accordance with claim 21 and further including the step of deveining the shrimp following the transport of said shrimp through the cutting station.

23. The method of processing shrimp in accordance with the method of claim 21 and further including the step of deflecting any unclamped shrimp located on said shrimp transport assembly onto a shrimp deflection means for deflecting shrimp to a desired location away from said transport assembly.

24. The method of processing shrimp in accordance with the method of claim 22 and further including the step of spraying said shrimp following the steps of cutting and deveining the shrimp and before removing the shrimp meat from the shrimp shell.

25. The method of processing shrimp is accordance with the method of claim 24 and further including the step of subsequently spraying fluid onto said shell following the removal of said shrimp meat from said shell thereby removing shrimp shell from the shrimp transport assembly.

* * * * *